R. C. WOODWARD.
INGOT MOLD AND METHOD OF MOLDING.
APPLICATION FILED SEPT. 23, 1919.
1,336,459.
Patented Apr. 13, 1920.
2 SHEETS—SHEET 1.
Fig. 1.
Fig. 2.
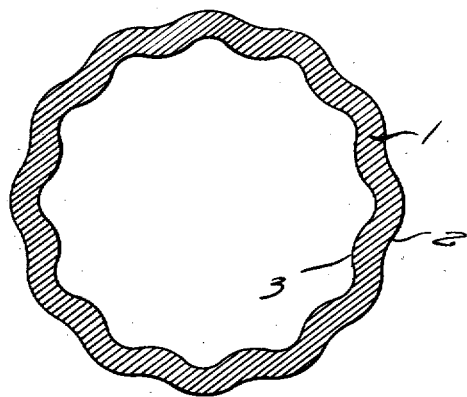
Fig. 4.
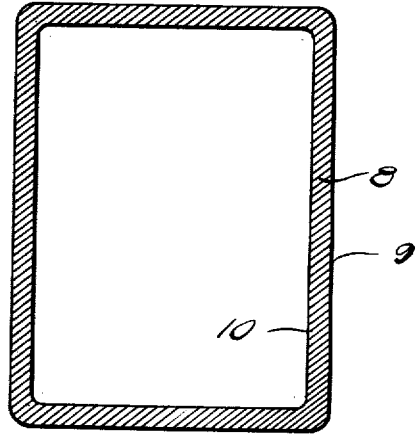
Inventor
Robert C. Woodward
By Julian C. Dowell
His Attorney R. C. WOODWARD.
INGOT MOLD AND METHOD OF MOLDING.
APPLICATION FILED SEPT. 23, 1919.

1,336,459.

Patented Apr. 13, 1920.
2 SHEETS—SHEET 2.

Inventor
Robert C. Woodward
By Julian C. Dowell
His Attorney

UNITED STATES PATENT OFFICE.

ROBERT C. WOODWARD, OF WILLIAMSPORT, PENNSYLVANIA.

INGOT-MOLD AND METHOD OF MOLDING.

1,336,459.  Specification of Letters Patent.  Patented Apr. 13, 1920.

Application filed September 23, 1919. Serial No. 325,634.

*To all whom it may concern:*

Be it known that I, ROBERT C. WOODWARD, a citizen of the United States, residing at Williamsport, in the county of Lycoming and State of Pennsylvania, have invented certain new and useful Improvements in Ingot-Molds and Methods of Molding; and I do hereby declare the following to be a full, clear, and exact description of the invention, such as will enable others skilled in the art to which it appertains to make and use the same.

This invention relates to the production of ingots and molds for casting the same. The primary object of the invention is to produce a mold and method of molding by means of which a substantially perfect ingot may be produced and thus avoid the waste of time and labor caused by a large per cent. of flaws, such as cracks, shrinkage holes, segregation, piping, run outs, etc. Heretofore in the manufacture of forging ingots these flaws, and especially the first mentioned cracks have been a constant menace to the success of the manufacture of forging ingots both from a metallurgical, as well as a financial point of view. I propose to obviate these defects in so far as is possible by means of accelerating and controlling the rate of cooling of the ingot, and also by molding the same in an inexpensive, yet strong mold, instead of the cumbersome weak molds previously used in the art.

From my observation and experience I have learned that there are no set rules to govern in the molding of ingots, although there are a great number of essential features which, unobserved, cause cracks and other defects. For example, it is agreed that the melting stock must be selected with care to see that no deleterious matter be introduced, and only a low percentage of phosphorus and sulfur be used. The proper temperature is also essential as has been before mentioned by me in an article in *The Iron Age*, of May 11, 1916. As described in this publication the pouring temperature is most essential and should not be unduly high, and large nozzles should also be used to facilitate pouring. I have also learned that the refining temperature is equally critical.

The ingots which entail the greatest risk and losses are those which crack without any reasonable explanation. There are numerous theories as to the cause of the cracks, as for example, the type of mold is at fault. Molds are too often designed to make a long, slim ingot with a view to saving time at the forge, but with a greater resultant loss in the making of the ingot than can possibly be offset by the saving in forging it. It is to the forgeman's advantage on a tonnage basis to have many ingots poured long and slender. It is clearly to the advantage of the purchaser to see that there is ample reduction in the cross-sectional area of the stock from which his important forgings are made, and where recognized specifications are followed this matter receives proper attention. It is not proposed to dwell upon other factors, such as forging temperature, thermal treatment of the forging and rate of reduction of areas, although there is considerable to be said from the ingot man's point of view on these subjects. I have witnessed reduction of area accomplished in such barbaric fashion that a well annealed casting would be preferable to the forging, so far as safety and service were concerned. The general shape of the cross-section of large molds is quite important. Many of the large molds are corrugated, and in such a mold the part to solidify first is naturally the surface of the ingot, which is chilled by the mold, and crystallization is started at right angles to the ingot's surface. If this is a plane surface it follows that the axes of crystallization are parallel lines. This results in the formation of cleavage planes, injurious to the ingot. But if the surface of the ingot is circular and corrugated, the axes of crystallization are crossed and interwoven, and leave no cleavage planes. I have observed from experience that the sharper the corrugations, the better were the average results.

One other way is noted in which the corrugations function in the prevention of lateral cracks. The metal in the convex corrugations of the ingot presents such a high ratio of surface in contact with the mold that it chills much more rapidly than the rest of the ingot and acts in the manner of reinforcing bars, binding the ingot together from top to bottom.

While there is no doubt as to the purpose of the corrugations and their value in the prevention of defective surfaces, there is another cause of surface cracking, upon which corrugations have relatively little or no effect. After the steel is poured into the mold and the surface of the ingot has started to solidify, the cooling contraction draws it slightly away from the supporting mold walls. At this particular time the newly forming thin walls of the ingot have very little strength, with an added weakening in certain areas caused by the washing effect of the currents that are set up in the liquid steel by the stream flowing from the ladle, until the pouring is completed. The result is that when the ingot first draws away from the supporting mold, the ingot wall does not have sufficient strength to resist the liquid pressure of the interior. This pressure ruptures the weak ingot shell, and either pushes it back against the mold or allows a small amount of the liquid inner steel to flow out and of course chill between the mold and the ingot shell. These runouts somewhat resemble splashes, for which they are frequently mistaken. If the ingot wall is pushed out to the mold when this rupture occurs the result is a hair crack, but if a runout occurs there is almost sure to be a serious crack.

From the above it would seem that the present practice of casting large ingots in metallic molds can be improved if some way is devised by which the nascent walls of the ingot can be supported or strengthened for a short time just after they pull away from the original support of the mold. One way of getting this result is by increasing the thickness of the mold walls, thereby adding that much more chilling effect, likewise adding to the weight and cost of the mold. Anyone who has had the opportunity to observe the results of two large ingot molds of the same capacity and internal cross-section, but of unequal outside dimensions probably will have noted that the ingots produced in the heavier mold averaged considerably better with regard to freedom from cracks and other surface defects than did the ingots cast in the lighter mold. Increasing the thickness of the container walls is crude but effective. One objection to it is that it at once advances the mold cost. This may be offset by the increased shop efficiency and increased life of the mold. But on account of the uncertainties and risks of this business generally it is impracticable to purchase expensive molds. A second objection is that the rate of cooling is fixed. The condition sought is that in which the rate of cooling can be rapidly accelerated immediately after the pouring, until a solid skin or shell is formed, and then tapered off to an annealing temperature in which the internal stresses can relieve themselves.

I have discovered that a substantially perfect ingot may be produced in a relatively light mold of shell steel of any shape or cross-section, as for example, square, rectangular, octagonal, corrugated or circular, to meet the requirements of the trade, but I preferably use a mold which has an internal cross-section of sharp convex corrugations on account of the finished product which is more ductile and malleable and therefore more readily lends itself to be forged. Also it is desirable in the use of said mold to accelerate and control the rate of cooling especially on the surface of the ingot without increasing the weight and cost of the mold. Accordingly, I use water to cool my mold. In order to distribute this cooling medium and thereby regulate the cooling of the mold, I employ a heavy perforated pipe coil or coils which encircle the mold from the base to the apex and serve to throw jets of water on the mold. Located along the coil at convenient intervals are valves which permit the water to be cut off at any desired interval as it flows in from the bottom. In this manner I am able to keep the mold hotter toward the top than toward the bottom and allow the average temperature to increase after the initial cooling period sufficiently to allow the heat on the interior of the ingot to slowly raise the temperature of the exterior, and thus avoid any very great cooling strain.

I provide a mold which is a steel casting of ordinary analysis that will combine the qualities of lightness, toughness and strength, and will surpass cast iron many times in resistance to thermal and mechanical shock. The cast iron mold is subject to failure, aside from the ordinary wearing and cutting away of its interior surfaces, chiefly from cracking due to violent temperature changes and mechanical shock. A sharp change in temperature is brought about when the molten steel is poured into the comparatively cold mold. It is a common occurrence for a mold to crack just at this period. The majority of molds are broken by mechanical shock in handling, generally due to bumping and stripping. They commence to crack at the bottom corners, and once these cracks are started they extend rapidly upward and soon result in the mold being scrapped. Usually, temperature cracks are lateral and mechanical cracks are vertical and located in the corner radii. With my steel mold of comparatively thin walls, the tendency to crack from either thermal or mechanical shock is very greatly reduced, somewhat on account of the greater tensile strength, but principally on account of the much greater toughness of mild steel as compared to cast iron. Molds embodying this principle can be used either with or without hot top brick. By cooling the lower part of the ingot more than the top the purpose is to insure freedom from piping throughout the greater length of the ingot. This will do away to some extent with the need for special hot top brick. The mold is not proposed exclusively for forging ingot practice but for the manufacture of any large ingot. It is believed that large ingots for plate mill work can be cast in this type of mold to better advantage than by the bottom pour method now used so extensively throughout the East, and that this practice will be found superior to any other in giving a workmanlike finish to plates and insuring freedom from cracks, pits, snakes and blisters in so far as these defects are attributable to the ingot.

The invention will first be hereinafter more particularly described, with reference to the accompanying drawings, which are to be taken as a part of this specification, and then pointed out in the claims at the end of the description.

In said drawings

Figure 1 is a front elevation of a preferred form of mold;

Fig. 2 is a cross-section of the same;

Fig. 4 is a cross-section of the same; and

Figure 5:
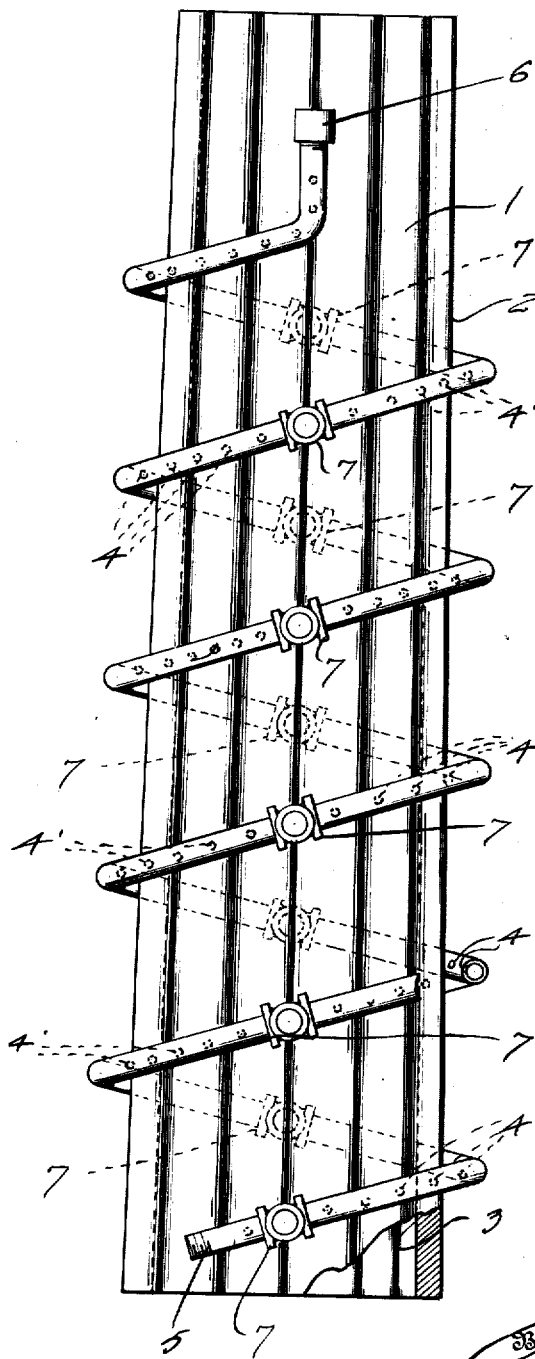
Fig. 5 is a front elevation of the mold and coil in assembled relation.
Figure 3:
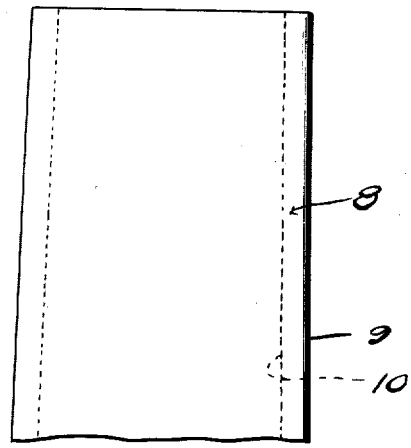
Fig. 3 is a broken section of another form of mold.

Referring to said drawings, in which the same reference numerals are used to denote corresponding parts in different views; in Figs. 1, 3, and 5 the mold 1 is a tapered shell formed of a single piece of steel of relatively light section, the same weighing about one-half the weight of the present day molds. However, the mold may be split into two or more pieces diagonally or as suits the need. In Fig. 5 encircling the mold is a coil of pipe 4 which is preferably of heavy material and contains numerous perforations 4¹. Situated at approximately 180° apart are valves of which, when opened allow the water to flow through and cool that section of the mold when the water is forced through the perforations 4¹. The shell of the mold is relatively light in cross-section having its exterior and interior surfaces 2 and 3 respectively, smooth. The ends 5 and 6 of the pipe coil 4 readily lend themselves to be connected to a water supply and drain system respectively. When the end 5 of the pipe coil is connected to a supply system and the first valve 7, located along the coil, is opened the water flows along and cools the mold as far as the second valve which may be opened at will and the water allowed to proceed to the next valve, and so on, cooling the mold.

In Fig. 2 is shown a cross-section of the mold 1 having exterior and interior corrugated surfaces 2 and 3 respectively.

In Fig. 4 is shown a cross-section of a modified form of mold having a body 8 relatively light in cross-section of steel. The exterior and interior surfaces 9 and 10 respectively are smooth.

In operation all the valves are closed and the water is allowed to flow to the first valve. The molten metal is poured into the tapered mold through large nozzles and the valves are then opened if the temperature is too high, one by one from the base upwardly along the coil. By this method a substantially perfect ingot will be produced.

Having thus described my invention, what I claim as new, and desire to secure by Letters Patent is:

1. The method of molding ingots comprising the continuous and progressive application of water to the exterior surface of the mold commencing at the bottom thereof and continuing toward its upper end, thereby accelerating and controlling the cooling of an inclosed ingot.

2. The method of molding ingots which consists in pouring molten metal into a mold of relatively light steel, and cooling the same by the application of water on the exterior surface of the mold.

3. The method of molding ingots which consists in pouring molten metal into a mold of relatively light steel and applying water upon the external surface of the mold at intervals spirally around the mold from the bottom upwardly.

4. The herein described method of molding ingots which consists of pouring the molten metal into an ingot mold of relatively light steel and water cooling the same by the application of water to the surface of the mold from its bottom by a gradual upward movement of the cooling medium.

5. An ingot mold of relatively light shell steel, having an interior surface of sharp concave corrugations extending continuously around said surface and tapering from the base upwardly.

6. An ingot mold consisting of a relatively light steel casting having sharp corrugated surfaces, a coil of heavy iron pipe having spray exits or perforations and surrounding said mold, and valves in said coil.

7. An ingot mold consisting of a relatively light steel casting having a coil of perforated pipe about said casting for the purpose of accelerating and controlling the cooling of said mold.

8. An ingot mold composed of relatively light steel having exterior and interior surfaces, each alternately concave and convex entirely around the same.

9. An ingot mold composed of relatively light steel having exterior and interior corrugations extending entirely around the same and tapering toward its upper end.

In testimony whereof I affix my signature in the presence of two witnesses.

ROBERT C. WOODWARD.

Witnesses:
L. R. ZEIGLER,
W. CLYDE STRAYER.